(12) United States Patent
Ryan

(10) Patent No.: US 7,969,048 B2
(45) Date of Patent: Jun. 28, 2011

(54) CAN STACK LINEAR ACTUATOR

(75) Inventor: Jump Ryan, East Hampton, CT (US)

(73) Assignee: Tritex Corporation, Waterbury, CT (US)

( * ) Notice: Subject to any disclaimer, the term of this patent is extended or adjusted under 35 U.S.C. 154(b) by 67 days.

(21) Appl. No.: 12/480,890

(22) Filed: Jun. 9, 2009

(65) Prior Publication Data

US 2010/0308671 A1 Dec. 9, 2010

(51) Int. Cl.
H02K 1/04 (2006.01)
(52) U.S. Cl. .......................................................... 310/43
(58) Field of Classification Search .................. 310/43, 310/80, 49.01–49.55
See application file for complete search history.

(56) References Cited

U.S. PATENT DOCUMENTS

| | | | |
|---|---|---|---|
| 4,355,248 A | 10/1982 | Manson | |
| 5,187,400 A * | 2/1993 | Kurata | 310/49.12 |
| 5,254,892 A * | 10/1993 | Bosman et al. | 310/49.18 |
| 6,603,229 B1 | 8/2003 | Toye | |
| 6,700,294 B2 | 3/2004 | Horng et al. | |
| 6,774,517 B2 * | 8/2004 | Kowalski et al. | 310/80 |
| 6,932,319 B2 | 8/2005 | Kowalski | |
| 7,378,768 B2 * | 5/2008 | Ohkawa et al. | 310/71 |

* cited by examiner

Primary Examiner — Nguyen N Hanh
(74) Attorney, Agent, or Firm — Carmody & Torrance LLP

(57) ABSTRACT

A linear actuator motor design including a rotor assembly that has an insert molded into a non-magnetic sleeve through a plurality of openings, which is kept from rotating within the non-magnetic sleeve by at least one opening arranged along the length of the non-magnetic sleeve which corresponds to at least one tab formed by the molded material of the insert and a stator assembly having a plurality of symmetrical and interchangeable magnetic pole plates. Each of the plurality of magnetic pole plates comprises a substantially planar plate portion with a central opening therein and a plurality of prongs extending from the central opening and substantially perpendicular to the plate portion. The prongs of the plurality of magnetic pole plates create an opening that is dimensioned to receive the rotor assembly therein. A non-conductive material is the molded over the plurality of magnetic pole plates.

16 Claims, 5 Drawing Sheets

CAN STACK LINEAR ACTUATOR

FIELD OF THE INVENTION

The present invention relates generally to improvements in motors including DC stepper motors.

BACKGROUND OF THE INVENTION

A linear actuator is a device that is used to perform an operation along a linear path. In one configuration, rotary motion is translated into linear motion by passing a lead screw through a threaded rotor of a rotary electric motor.

A can-stack linear actuator is a specific type of motor that converts electrical energy into precise and repeatable rotational movement. Converting this rotary motion into linear motion can be accomplished in several ways. The simplest way is through an external linear motor design, in which a lead screw is rigidly fixed to the rotor, and as the rotor rotates, a linear nut external to the motor will traverse the lead screw. Another way is to use a non-captive motor design which transforms this rotary motion-using threads centrally located in the rotor. As the rotor turns and the lead screw is held from rotating using an external nut, it retracts and extends depending on the rotor direction. Similarly, the captive motor design uses a lead screw and shaft assembly attached to a pinion which prevents the lead screw from rotating using a custom sleeve and is internal to the motor. Examples of this type of motor design can be found for example in U.S. Pat. No. 6,774,517 to Kowalski et al. and in U.S. Pat. No. 6,603,229 to Toye, IV, the subject matter of each of which is herein incorporated by reference in its entirety.

The present invention describes improvements that are applicable to a captive motor design, but that are also viable for all can-stack designs. In addition, the present invention describes these improvements as applied to DC stepper motors but they also lend themselves to other types of DC motors.

Current can-stack motor designs have large tolerance stack-ups and concentricity issues. Regardless of the control on the process or the accuracy of the tooling, it is difficult to create parts with identical dimensions. When designing a can-stack motor, a trade-off occurs between cost and tolerance accuracy across multiple parts. It is therefore necessary to compensate for these tolerances in the nominal dimensions of each part to gain a factor of safety in the final assembly.

FIG. 1 depicts a cross section of a typical prior art can-stack design. A sleeve bearing 12 having a bearing inner diameter 14 and a bearing outer diameter 16 is held in place front sleeve 10. A shaft (not shown) is encased in and extends through the length of front sleeve 10 and into the interior of rotor assembly 20. The sleeve bearing 12 is accommodated within a radial spacing between the front sleeve 10 and rotor assembly 20. Pole plates 22 are arranged around the magnetic rotor assembly 20. Ultimately, the design must insure proper clearances between the outer diameter of the rotor assembly 20 and the inner diameter of the pole plates 22, in order to avoid interference between them. The resulting air gap between the inner diameter of the pole plates 22 and the outer diameter of the rotor assembly 20 also can be quite large. It is highly desirable to control this air gap by minimizing the air gap as low as possible to produce a better magnetic field and thus generate more torque.

In addition, as seen in FIG. 2, the rotor assembly 20 typically comprises a plastic insert 30 that gets molded inside magnet 32. Concentricity between the magnet outer diameter, the internal threads (not shown) and the bearing journals 34 can be controlled during the molding process. The molded insert 30 has bearing journals 34 on either end that accept the inner diameter of the bearings. In order to keep the tolerance stack-up as low as possible, a tight tolerance must be held on the outer diameter of the molded bearing journal, increasing the piece price cost and complexity of the tooling. In addition, the inner diameter of the bearing needs to be ground to minimize the tolerance stack, which also adds cost to the bearing. The motor comprises two, separate front and rear sleeves which have molded bearing pockets. The diameter of the bearing pockets needs to be held to tight tolerance in order to ensure proper alignment between the front sleeve, rear sleeve, bearings and rotor. In addition to the bearing pockets, the sleeves contain the bobbin that the motor wire gets wound onto. Again, this creates multiple parts that have high cost and complex tooling.

SUMMARY OF THE INVENTION

It is an object of the present in invention to provide a can stack linear actuator design that includes a rotor assembly comprising an internal anti-rotation feature.

It is an object of the present invention to provide a can stack design that can more precisely control the air gap between the inner diameter of the pole plates of the stator and the outer diameter of the rotor.

It is another object of the present invention to provide an improved can-stack linear actuator motor design that reduces an air gap between an inner diameter of the stator assembly and an outer diameter of the rotor assembly to increase the torque output of the motor.

It is still another object of the present invention to reduce the total number of parts needed for assembling the linear actuator as well as the cost of tooling.

It is still another object of the present invention to solve alignment issues of various parts of the linear actuator motor.

To that end, the present invention relates generally to a rotor assembly for use in a motor assembly, the rotor assembly comprising:

a) a non-magnetic sleeve having a molded insert formed therein; and b) a molded magnetic material arranged over the non-magnetic sleeve;

wherein the molded insert is kept from rotating within the non-magnetic sleeve by at least one opening arranged along the length of the non-magnetic sleeve which corresponds to at least one tab formed by the molded material of the insert.

In addition, the present invention also relates generally to a stator assembly dimensioned to receive the rotor assembly therein, the stator assembly comprising:

(a) a plurality of magnetic pole plates, said plurality of magnetic pole plates comprising a substantially planar plate portion with a central opening therein, and a plurality of prongs extending from the central opening and substantially perpendicular to the plate portion, the plurality of magnetic pole comprising:

i) two inner pole plates arranged with their respective plate portions proximate to each other and their respective plurality of prongs facing outward from each other;

ii) two outer pole plates arranged on either side of the two inner pole plates, said respective outer pole plates having their respective plurality of prongs facing inward toward the prongs of the two inner pole plates; and (b) a non-conductive material molded over the plurality of magnetic pole plates;

wherein the prongs of the plurality of magnetic pole plates create an opening that is dimensioned to receive a rotor assembly therein.

BRIEF DESCRIPTION OF THE DRAWINGS

For a fuller understanding of the invention, reference is had to the following description taken in connection with the accompanying figures, in which.

Also, while not all elements may be labeled in each figure, all elements with the same reference number indicate similar or identical parts.

DETAILED DESCRIPTION OF THE PREFERRED EMBODIMENTS

The present invention relates generally to improvements in can-stack motor designs, which include an improved rotor design with an internal anti-rotation feature as well as an improved stator design. The motor design described herein also reduces the tolerance stack-up which permits a decrease in the air gap between an inner diameter of the stator assembly and an outer diameter of the rotor assembly which produces a better magnetic field and increases the torque produced by the motor.

Magnet material plays an important role in torque output, and rare earth magnet materials can be used in the motor design described herein to produce a much stronger product at a fraction of the size. These new materials make it possible to decrease the thickness of the magnet and optimize rotor size, creating new design possibilities for improving the internal components and construction of the motor.

In one embodiment, the rotor assembly of the invention comprises:

a) a non-magnetic sleeve having a molded insert formed therein; and b) a molded magnetic material arranged over the non-magnetic sleeve;

wherein molded insert is kept from rotating within the non-magnetic sleeve by at least one opening arranged along the length of the non-magnetic sleeve which corresponds to at least one tab formed by the molded material of the insert.

Figure 1:
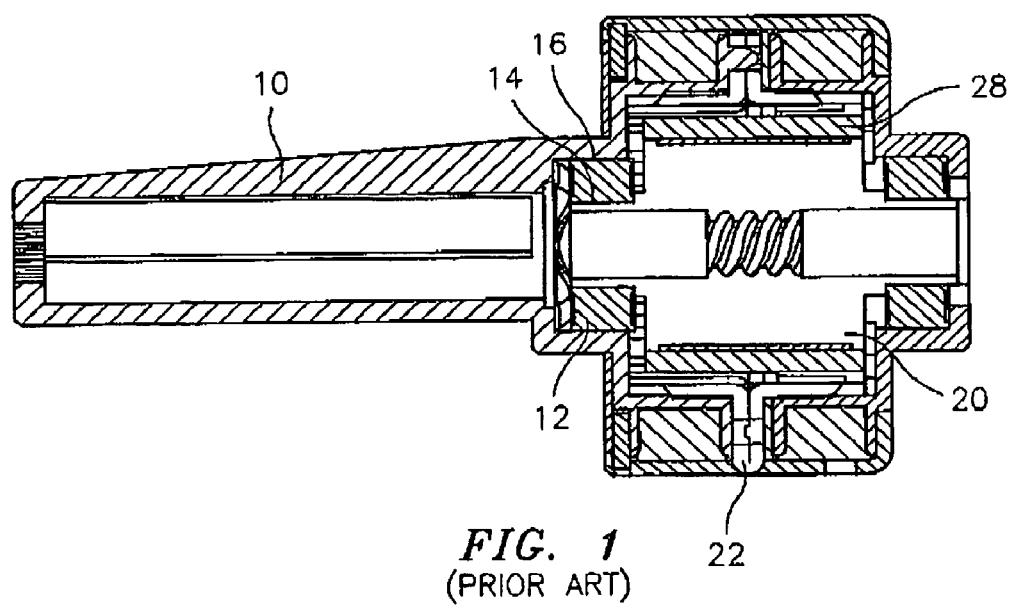
FIG. 1 depicts a cross-sectional view of a prior art can-stack design.
Figure 2:
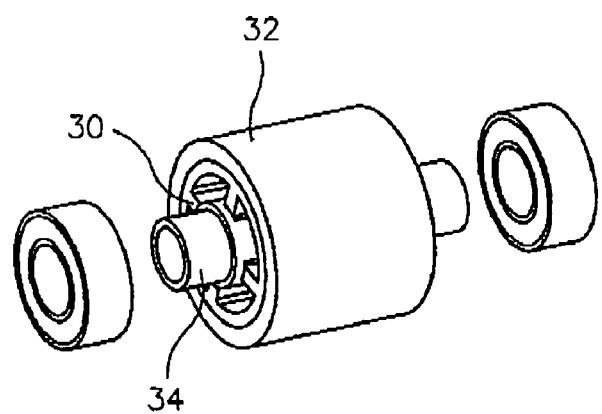
FIG. 2 depicts a view of a prior art rotor assembly.
Figure 3:
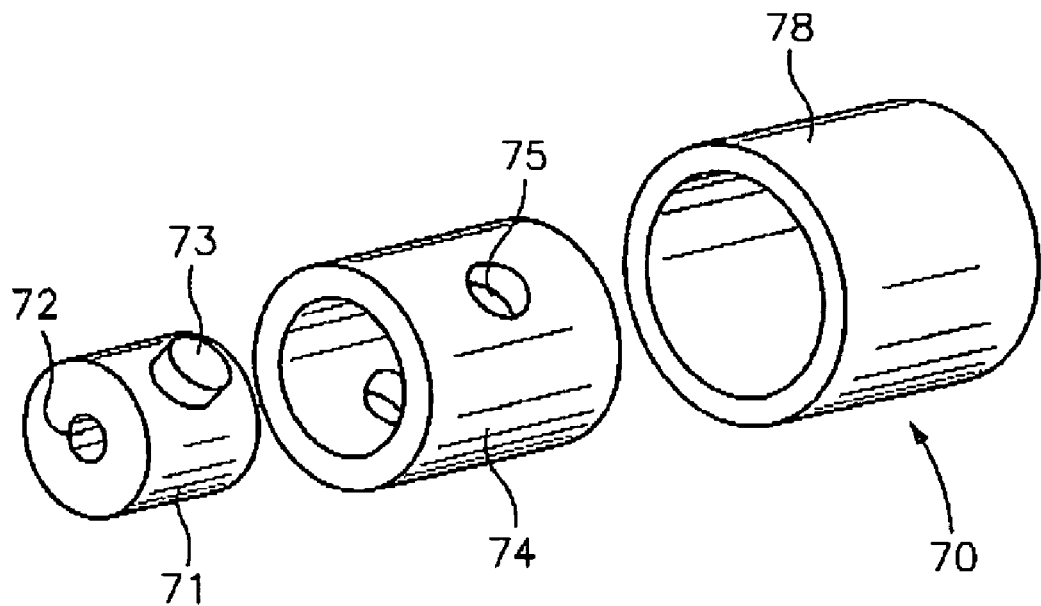
FIG. 3 depicts a view of a can-stack rotor assembly in accordance with one aspect of the present invention.
Figure 4:
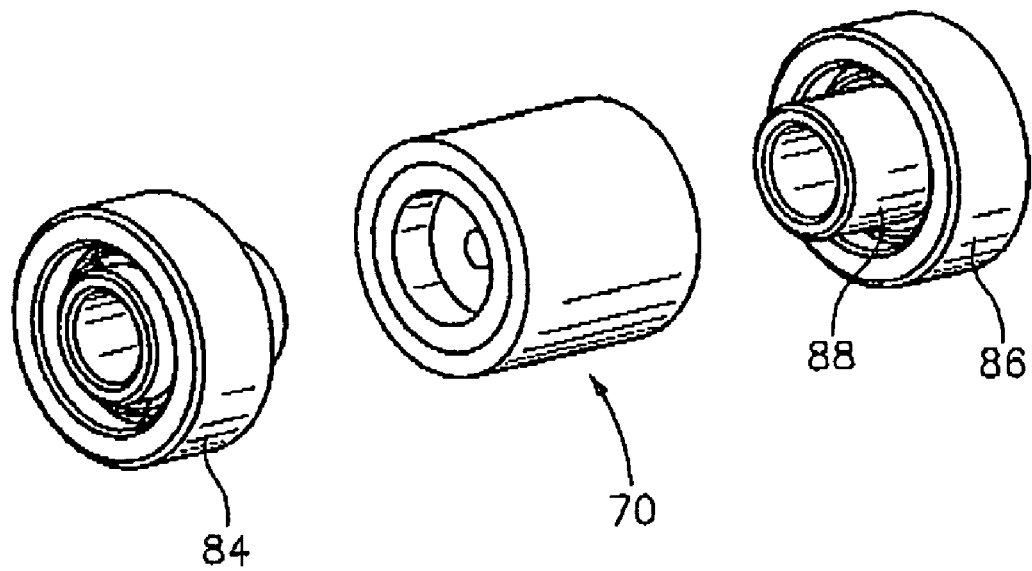
FIG. 4 depicts a view of a rotor assembly and bearings in accordance with another aspect of the present invention.

FIGS. 3 and 4 illustrate a rotor assembly 70 constructed in accordance with one aspect of the present invention. The rotor assembly 70 comprises a molded insert 71 having threads 72, wherein the insert is injection molded into a non-magnetic sleeve 74 which is then prevented from movement by an anti-rotation feature, which in one embodiment comprises at least one tab 73 that is molded with the molded insert 71 and is thus formed when the insert 71 is molded into the non-magnetic sleeve 74. The at least one tab 73 fills the at least one opening 75 in the non-magnetic sleeve 74.

In one embodiment of the invention, the non-magnetic sleeve 74 is an aluminum sleeve. Other non-magnetic materials for making the sleeve would also be known to those skilled in the art and are usable in the practice of the invention.

The molded insert 71 of the rotor assembly 70 typically comprises a polymeric, elastomeric or plastic material. The molded insert 71 also comprises threads 72 formed therein, wherein said threads 72 are formed therein during the molding process. Alternatively, the threads can be post-machined; however, it is generally preferable to form the threads during the molding process.

In one embodiment of the invention, the molded magnet 78 that is arranged over the aluminum sleeve 74 of the rotor assembly 70 comprises a rare earth magnet material that then gets compression molded or bonded onto the outer diameter of the aluminum sleeve creating the completed rotor assembly. Examples of rare earth magnetic materials that are usable in the present invention include neodymium iron boron (NdFeB), samarium cobalt (SmCo), ceramic and aluminum nickel cobalt (AlNiCo). NdFeB material is preferable. The benefit of using these rare earth magnetic materials is the higher $BH_{max}$ that can be generated, including a $BH_{max}$ of 9.5-10.5 MGOe as compared to conventional magnetic materials that can only generate 2-4 MGOe. $BH_{max}$ (Maximum Energy Product) is defined as the magnetic field strength at the point of maximum energy product of a magnetic material, and the field strength of fully saturated magnetic material measured in Mega Gauss Oersteds (MGOe).

There are four classes of modern commercialized magnets, each based on their material composition. Within each class is a family of grades with their own magnetic properties. NdFeB and SmCo are collectively known as Rare Earth magnets because they are both composed of materials from the Rare Earth group of elements. Neodymium Iron Boron (general composition $Nd_2Fe_{14}B$, often abbreviated to NdFeB) is the most recent commercial addition to the family of modern magnet materials.

At room temperatures, NdFeB magnets exhibit the highest properties of all magnet materials. Samarium Cobalt is manufactured in two compositions: $Sm_1Co_5$ and $Sm_2Co_{17}$—often referred to as the SmCo 1:5 or SmCo 2:17 types. 2:17 types, with higher Hci values, offer greater inherent stability than the 1:5 types. Ceramic, also known as Ferrite, magnets (general composition $BaFe_2O_3$ or $SrFe_2O_3$) have been commercialized since the 1950s and continue to be extensively used today due to their low cost. A special form of Ceramic magnet is "Flexible" material, made by bonding Ceramic powder in a flexible binder. Alnico magnets (general composition Al—Ni—Co) were commercialized in the 1930s and are still extensively used today. In a preferred embodiment, the permanent magnet material of the invention comprises neodymium iron boron.

In addition, because the molded threads 72 need to be precisely located at the center of the motor, the aluminum sleeve 74 requires an accurate inner diameter. FIG. 4 depicts bearings 84 and 86 that have an extended inner race 88 that can be slip fitted into the precise, inner diameter of the aluminum sleeve 74 of the rotor assembly. Even though these bearings are custom, they can still be more cost-effective than the current can-stack bearings because they only require a machined inner diameter that does not need to also be precision ground. In the construction of the present invention, the inner diameter of the bearing is a clearance diameter that has no functional use in the assembly of the motor.

For this reason as well, the costly internal diameter grinding operation can be avoided at the limited additional expense of controlling the outer diameter of the extended race 88. Since that surface mates with the inner diameter of the aluminum sleeve 74 within the rotor assembly 70 it can be precision ground via a more cost effective external diameter grinding operation. This expense is limited because the precision of the surface is already required in the vicinity of ball bearing races, and it's merely carried out onto the extension. This construction is virtually self-aligning and requires no assembly tools.

Figure 5:
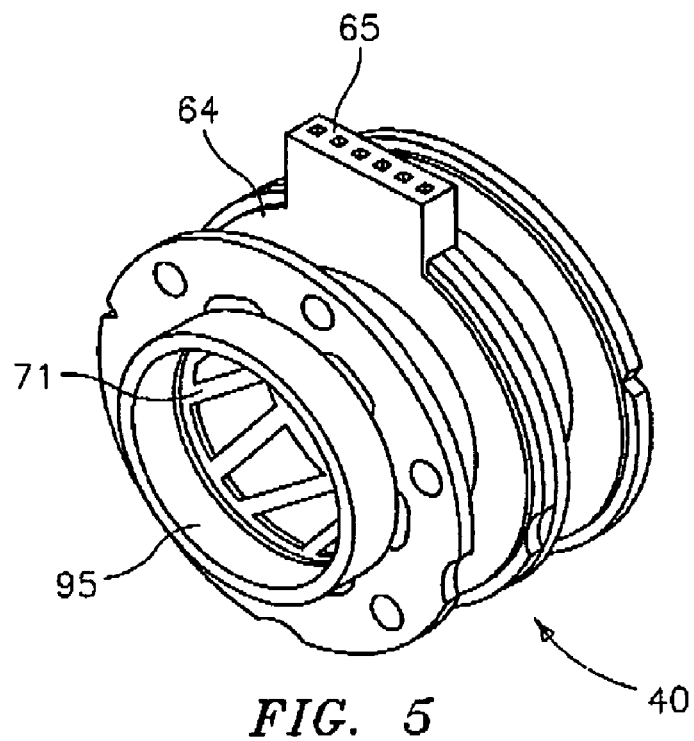
FIG. 5 depicts a view of a can-stack stator assembly in accordance with an aspect of the present invention.
Figure 6:
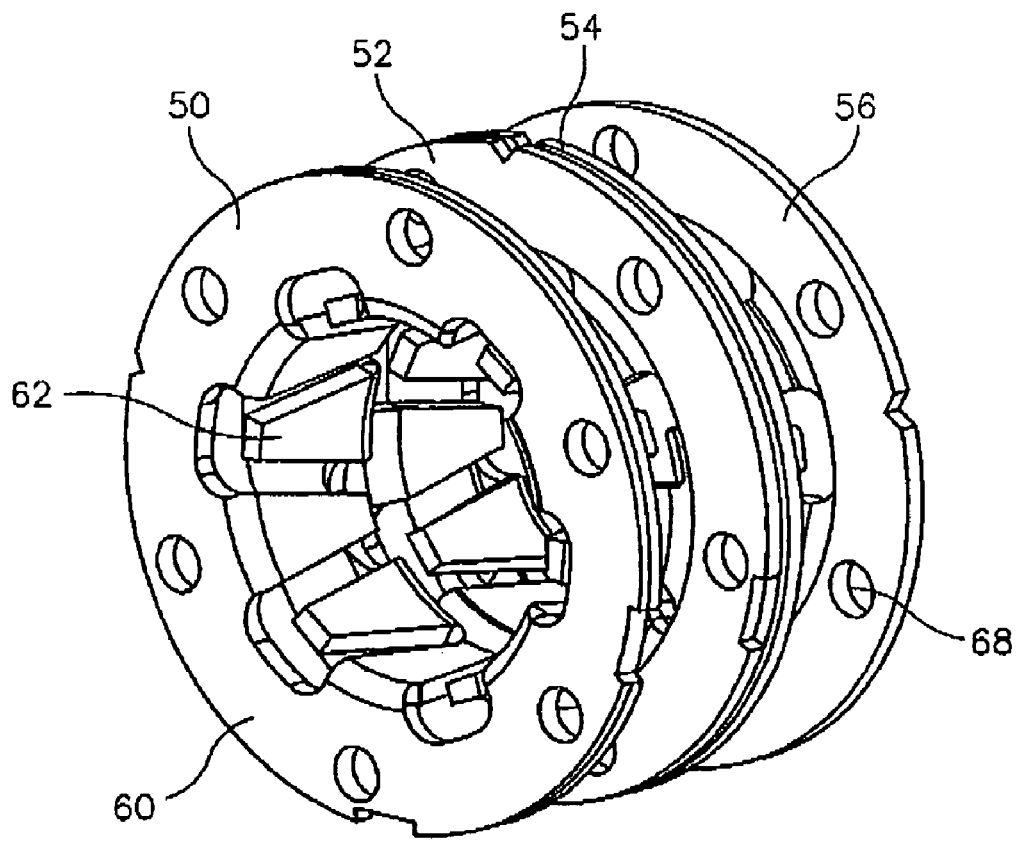
FIG. 6 depicts the plurality of pole plates of the stator assembly of the present invention without the non-conductive overlayer.
Figure 7:
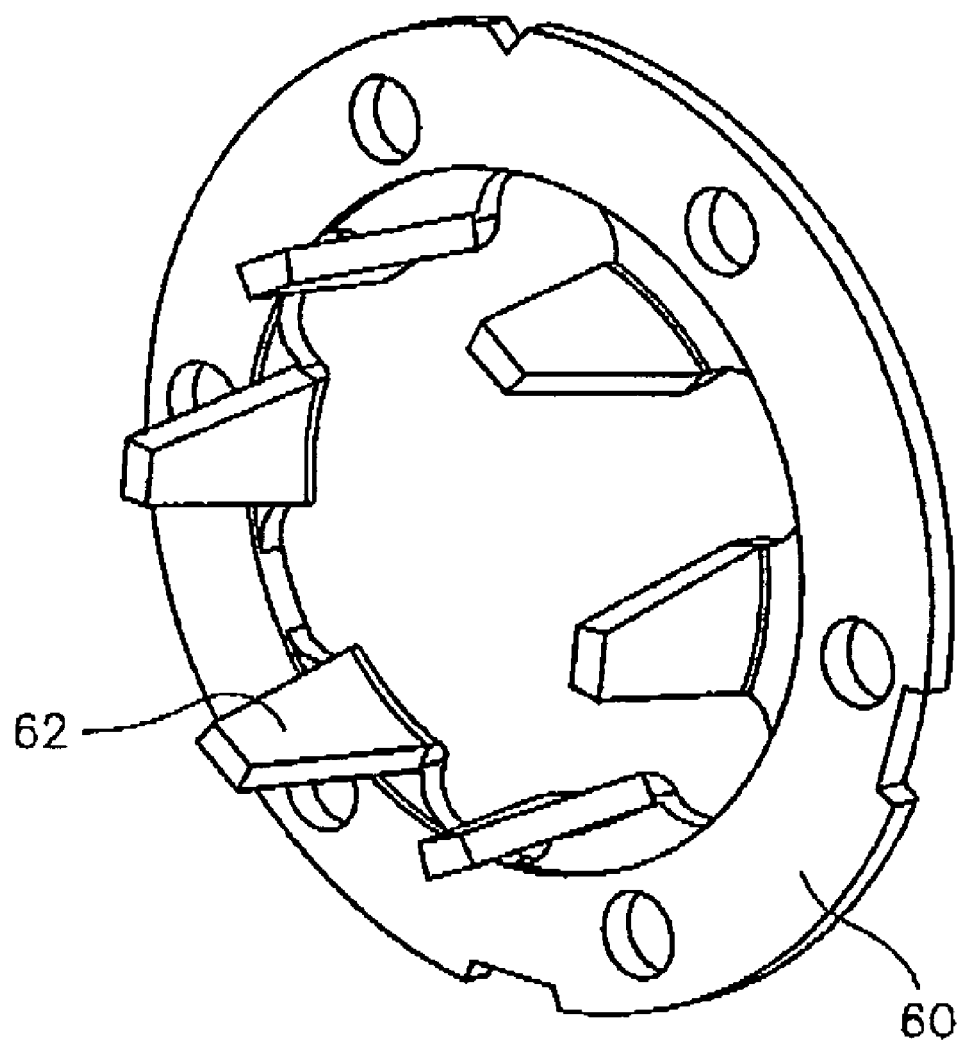
FIG. 7 depicts one of the four identical pole plates usable in the stator assembly of the present invention.

Furthermore, the present invention comprises a stator assembly 40 dimensioned to receive the rotor assembly 70 therein, as depicted in FIGS. 5-7, the stator assembly 40 comprising:

(a) a plurality of magnetic pole plates 50, 52, 54 and 56, said plurality of magnetic pole plates 50, 52, 54, and 56 comprising a substantially planar plate portion 60 with a central opening therein, and a plurality of prongs 62 extending from the central opening and substantially perpendicular to the plate portion 60, the plurality of magnetic pole plates 50, 52, 54 and 56 comprising:
  i) two inner pole plates 52 and 54 arranged with their respective plate portions 60 proximate to each other and their respective plurality of prongs 62 facing outward from each other;
  ii) two outer pole plates 50 and 56 arranged on either side of the two inner pole plates 52 and 54, said respective outer pole plates 50 and 56 having their respective plurality of prongs 62 facing inward toward the prongs 62 of the two inner pole plates 52 and 54; and
(b) a non-conductive material 64 molded over the plurality of magnetic pole plates 50, 52, 54 and 56;

wherein the prongs 62 of the plurality of magnetic pole plates 50, 52, 54 and 56 create an opening that is dimensioned to receive the rotor assembly therein.

As best seen in FIG. 6, the plurality of magnetic pole plates 50, 52, 54 and 56 are arranged so that the prongs 62 of the respective plates are nestled with each other. In addition, one of the benefits of the present invention is that the plurality of magnetic pole plates 50, 52, 54 and 56 are at least substantially identical so that the plurality of magnetic pole plates are symmetrical and interchangeable with each other.

The plurality of magnetic pole plates 50, 52, 54 and 56 also comprise alignment means 68, wherein the two inner pole plates 52 and 54 and the two outer pole plates 50 and 56 are indexed to a correct step angle location prior to being overmolded with the non-conductive material 64. In one embodiment, the alignment means comprise a plurality of alignment holes 68 arranged around each of the plurality of magnetic pole plates 50, 52, 54 and 56. Other suitable alignment means would also be well known to those skilled in the art.

The stator assembly 40 also may have a bearing pocket 95 formed therein. During the overmolding process, a pocket 95 dimensioned to receive a bearing therein may be formed in at least a first end of the stator assembly 40 adjacent to at least one outer pole plate. In addition, a wire termination 65 may also be formed in the stator assembly by the overmolded non-conductive material 64.

In one embodiment, the non-conductive material 64 comprises a polymer, elastomeric or plastic material, including rubber or plastic and more preferably, comprises a polymer blend or Nylon 66. Other similar non-conductive materials having similar properties are also usable in the present invention.

In the stator assembly 40 described herein, the overmolding process maintains the plurality of pole plates in proper position. In contrast, in prior art stator assemblies it has previously been necessary to weld together the pole plates. As discussed above, all four pole plates are identical, thereby reducing tooling costs and improving precision since they are made from the same tool.

During this overmolding process, bearing pockets 95 are formed by the central core. Since the core must shut-off the plastic flow on the pole plates at the stator inner diameter, it has inherently tight tolerances. This intrinsic precision carries over to the bearing pocket diameter resulting in tight tolerance held between the stator inner diameter 71, the bearings and ultimately the rotor assembly. Unlike earlier designs, the critical bearing pocket diameters are integral to the stator assembly and not controlled within the separate front and rear sleeve parts. In conventional designs, to get the bearings concentric was difficult because they were just sitting in pockets on the front and rear sleeve parts which resulted in alignment issues. The new design utilizes more concentric bearing pockets that are located on the stator and not on the sleeve parts. This is important because it allows the use of less expensive thermoplastics without having to be concerned with the shoulders wobbling. In addition, the critical assembly tolerance stack-up is controlled across one over-molded assembly as opposed to multiple molded and stamped parts. This molding process creates a completed stator assembly that requires no special tooling in the final assembly of the motor.

The present invention also relates generally to a method of making a stator assembly, comprising the steps of:

(a) providing a plurality of magnetic pole plates, each of said plurality of magnetic pole plates comprising a substantially planar plate portion with a central opening therein, and a plurality of prongs extending from the central opening and substantially perpendicular to the plate portion;

(b) arranging a first set of the plurality of magnetic pole plates so that their respective plate portions are proximate to each other and their respective plurality of prongs facing outward from each other;

c) arranging a second set of the plurality of magnetic pole plates on either side of the first set of the plurality of magnetic pole plates, wherein said second set of the plurality of magnetic pole plates have their respective plurality of prongs facing inward toward the prongs of the first set of the plurality of magnetic pole plates; and (d) overmolding a non-conductive material over the plurality of magnetic pole plates.

Figure 8:
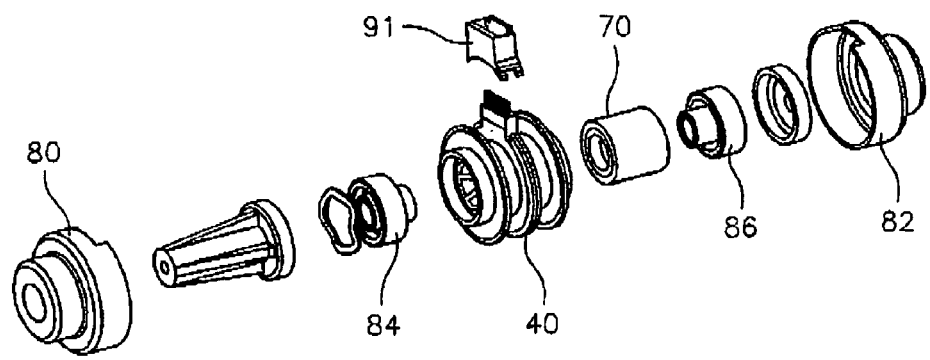
FIG. 8 depicts an exploded view of a can-stack motor assembly constructed in accordance with the present invention.
Figure 9:
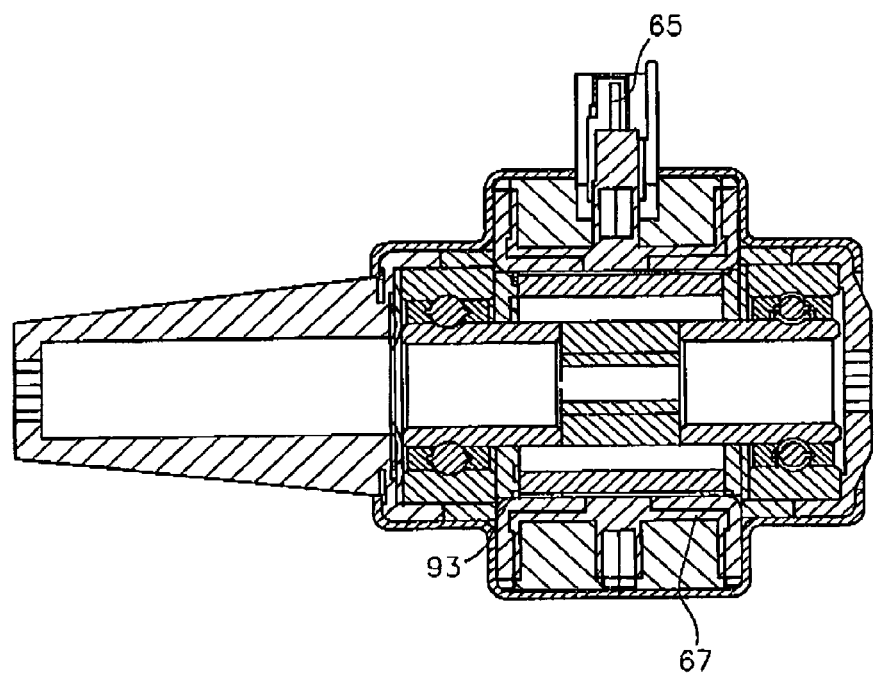
FIG. 9 depicts a cross-sectional view of the can-stack motor assemble constructed in accordance with the present invention.

The rotor 70 and stator 40 assemblies described above are usable in various motor designs including, for example canstack linear actuators, as depicted in FIGS. 8 and 9, which typically comprise:

a) a front sleeve 80 and a rear sleeve 82, wherein said front sleeve 80 and said rear sleeve 82 each comprise a double drawn cup, wherein the front sleeve 80 and the rear sleeve 82 are symmetrical and interchangeable;

b) a rotor assembly 70 arranged between the front sleeve 80 and the rear sleeve 82 as described above;

c) a front bearing 84 and a rear bearing 86 arranged on either side of the rotor assembly 70, wherein the front bearing 84 and the rear bearing 86 are symmetrical and interchangeable; and d) a stator assembly 40 as described above.

As discussed above and as seen in the accompanying figures, the present invention relates generally to a cost effective can-stack linear actuator, both in material and manufacturing cost. In one embodiment, symmetry within the motor allows for a family of parts to be interchangeable with one another, including the front and rear covers, the front and rear sleeves and all four pole plates, by way of example and not limitation. This reduces the total number of parts and cost for tooling. In addition, in the can-stack motor design described herein, except for the threads in the rotor insert, the rotor is not specific as which way it is inserted into the motor assembly. Furthermore, the can-stack motor design described herein provides good results for motors that are less than about 2 inches in diameter although it is also usable with other size motors as well.

In another embodiment, special fixtures 68 locate the pole plates of the stator in the proper position during the molding process and allow the same pole plate for all of the pole plates of the stator design to be used instead of four unique plates as was needed in can-stack motor designs of the prior art.

FIG. 8 illustrates an exploded view of the motor assembly constructed according to the embodiment of the present invention. FIG. 8 shows the complete new motor design in accordance with the present invention, less the lead screw and pinion. Along with completely redesigned internals to maximize torque, the exterior components of the motor assembly have also been improved upon. The motor internals are held together with double drawn cups 80 and 82 and, due to the symmetry of the motor, the same part can be used to cover the front and the rear, thus cutting down on tooling cost. There are no special tools required for preloading the motor because as the double drawn cups are welded together, the spring washer will automatically preload the bearings. The front and rear sleeves, although not exactly the same, are produced from the same mold, again reducing tooling cost. They each contain a shallow bearing pocket that mates with the bearings outer diameter in order to keep the motor properly aligned. This alignment, however, is not critical to the final air gap dimension 93 between the rotor and the stator (shown in FIG. 9). Both sleeves may also optionally but preferably contain ribs for stability and anti-rotation.

To better illustrate the internal components of the present invention, FIG. 9 shows a cross sectional view of a motor design in accordance with the present invention. As can be seen in FIG. 9, unlike the current design, the wire bobbin 67 is not contained in the front and rear sleeves. Wire termination 65 is achieved through pins that are pressed into the over molded plastic of the stator at a specific location. The female portion of a connector 91 is custom molded and is held in place by the double drawn covers 80 and 82 during assembly. This keeps debris out of the motor and makes for easy wire attachment and customization. One embodiment of the present invention includes an option to eliminate the connector portion and supply the customer with flying leads. A mounting flange can be welded to the front or rear double drawn cups 80 and 82 depending on customer request and is a simple stamped metal part. Again, this illustrates the flexibility of the design as it can accommodate a multitude of mounting options and configurations.

It should also be understood that the following claims are intended to cover all of the generic and specific features of the invention described herein and all statements of the scope of the invention that as a matter of language might fall there between.

What is claimed is:

1. A rotor assembly for use in a linear actuator motor assembly, the rotor assembly comprising:
 a) a non-magnetic sleeve having a molded insert formed therein; and
 b) a molded magnetic material arranged over the non-magnetic sleeve;

wherein the molded magnetic material is capable of generating a $BH_{max}$, defined as a magnetic field strength at a point of maximum energy product of a magnetic field, of between about 9.5 and 10.5 MGOe;
 wherein molded insert is kept from rotating within the non-magnetic sleeve by at least one opening arranged along the length of the magnetic sleeve which corresponds to at least one tab formed by the molded material of the insert.

2. The rotor assembly according to claim 1, wherein the non-magnetic sleeve of the rotor assembly comprises aluminum.

3. The rotor according to claim 1, wherein the insert comprises a polymeric, elastomeric or plastic material.

4. The rotor assembly according to claim 1, wherein the molded magnetic material comprises a permanent magnet material selected from the group consisting of neodymium iron boron, samarium cobalt, ceramic, aluminum nickel cobalt and combinations of one or more of the foregoing.

5. The rotor assembly according to claim 4, wherein the permanent magnetic material comprises neodymium iron boron.

6. The rotor assembly according to claim 1, wherein the molded insert comprises threads formed therein, wherein said thread are formed therein during the molding process.

7. The rotor assembly according to claim 1, wherein the rotor assembly is dimensioned to fit in a stator assembly, and the stator assembly comprises:
 (a) a plurality of magnetic pole plates, said plurality of magnetic pole plates comprising a substantially planar plate portion with a central opening therein, and a plurality of prongs extending from the central opening and substantially perpendicular to the plate portion, the plurality of magnetic pole plates comprising:
  i) two inner pole plates arranged with their respective plate portions proximate to each other and their respective plurality of prongs facing outward from each other;
  ii) two outer pole plates arranged on either side of the two inner pole plates, said respective outer pole plates having their respective plurality of prongs facing inward toward the prongs of the two inner pole plates; and
 (b) a non-conductive material molded over the plurality of magnetic pole plates;
 wherein the prongs of the plurality of magnetic pole plates create an opening that is dimensioned to receive the rotor assembly therein.

8. The rotor assembly according to claim 7, wherein the plurality of magnetic pole plates of the stator assembly are symmetrical and interchangeable.

9. The rotor assembly according to claim 8, wherein the plurality of magnetic pole plates comprise alignment means, wherein the two inner pole plates and the two outer pole plates are indexed to a correct step angle location prior to being overmolded with the non-conductive material.

10. The rotor assembly according to claim 9, wherein the alignment means comprises a plurality of alignment holes arranged around each of the plurality of magnetic pole plates.

11. The rotor assembly according to claim 7, wherein a pocket dimensioned to receive a bearing therein is formed in at least a first end of the stator assembly adjacent to at least one outer pole plate by the overmolded non-conductive material.

12. The rotor assembly according to claim 7, wherein a wire termination is formed in the stator assembly by the overmolded non-conductive material.

13. The rotor assembly according to claim 7, wherein the non-conductive material molded over the plurality of magnetic pole plates comprises a polymer blend or Nylon 66.

14. The rotor assembly according to claim 7, wherein an air gap between an inner diameter of the plurality of magnetic pole plates and the outer diameter of the rotor is minimized, wherein a strong magnetic field is created that increases torque.

15. The rotor assembly according to claim 7, further comprising:
 a) a front bearing and a rear bearing arranged on either side of the rotor assembly; and
 b) a front sleeve and a rear sleeve, wherein the front sleeve and the rear sleeve each comprise a double drawn cup, said front sleeve and said rear sleeve encasing said rotor assembly and said stator assembly therein,
 wherein the front bearing and the rear bearing are symmetrical and interchangeable and the front sleeve and the rear sleeve are symmetrical and interchangeable;
 whereby the number and parts and cost for tooling are reduced.

16. A modular stepper motor comprising symmetrical and interchangeable parts, said modular stepper motor comprising:
 a) a front bearing and a rear bearing arranged on either side of a rotor assembly, wherein said front bearing and said rear bearing are symmetrical and interchangeable;
 b) a front sleeve and a rear sleeve, wherein the front sleeve and the rear sleeve each comprise a double drawn cup and wherein the front sleeve and the rear sleeve are symmetrical and interchangeable, said front sleeve and said rear sleeve encasing said rotor assembly therein, the rotor assembly comprising:
  i) a non-magnetic sleeve comprising a plurality of openings therein through which a molded insert can be formed;
  ii) an insert molded into the non-magnetic sleeve through the plurality of openings, wherein the molded insert is kept from rotating within the non-magnetic sleeve by at least one opening arranged along the length of the magnetic sleeve which corresponds to at least one tab formed by the molded material of the insert; and
  iii) a molded magnetic material arranged over the non-magnetic sleeve, and
 c) a stator assembly dimensioned to receive the rotor assembly therein, the stator assembly comprising:
  (i) a plurality of magnetic pole plates, said plurality of magnetic pole plates comprising a substantially planar plate portion with a central opening therein, and a plurality of prongs extending from the central opening and substantially perpendicular to the plate portion, the plurality of magnetic pole plates comprising:
   (a) two inner pole plates arranged with their respective plate portions proximate to each other and their respective plurality of prongs facing outward from each other;
   (b) two outer pole plates arranged on either side of the two inner pole plates, said respective outer pole plates having their respective plurality of prongs facing inward toward the prongs of the two inner pole plates; and
  (ii) a non-conductive material molded over the plurality of magnetic pole plates, wherein the prongs of the plurality of magnetic pole plates create an opening that is dimensioned to receive the rotor assembly therein.

* * * * *